United States Patent [19]

Schaible et al.

[11] Patent Number: 4,619,466
[45] Date of Patent: Oct. 28, 1986

[54] WHEEL SUSPENSION

[75] Inventors: Walter Schaible, Hemmingen; Peter Mast, Ehningen, both of Fed. Rep. of Germany

[73] Assignee: Dr. Ing. h.c.F. Porsche AG, Fed. Rep. of Germany

[21] Appl. No.: 653,776

[22] Filed: Sep. 24, 1984

[30] Foreign Application Priority Data

Sep. 24, 1983 [DE] Fed. Rep. of Germany ....... 3334623

[51] Int. Cl.[4] .......................... B60G 11/08; B60G 3/06
[52] U.S. Cl. ...................................... 280/669; 267/52; 267/57; 280/688; 280/718
[58] Field of Search ............... 280/669, 663, 665, 673, 280/688, 694, 699, 718, 720; 267/57, 52

[56] References Cited

U.S. PATENT DOCUMENTS

| 2,152,660 | 4/1939 | Paton | 280/669 |
| 2,232,015 | 2/1941 | Skok | 280/669 |
| 3,765,698 | 10/1973 | Burrell | 280/669 |

Primary Examiner—Richard A. Bertsch
Attorney, Agent, or Firm—Craig and Burns

[57] ABSTRACT

A wheel suspension, especially a front wheel suspension for motor vehicles, in which the wheel carriers of mutually oppositely disposed wheels are connected each with a guide member, especially with a cross guide member which is pivotally connected at the body displaceable in the vertical direction by the interposition of a shock absorber. The cross guide member of each wheel is connected with the free end of a leaf spring, especially of a leaf spring of a fibrous material, which extends transversely to the vehicle longitudinal axis and is supported at the vehicle body. The free ends of the leaf spring are connected with the cross guide members at a distance with respect to the latter by way of interposed guide arms. The guide arms are retained in elastic bearings relatively movably and pivotally to the cross guide members and include at their ends opposite these bearings, clamping devices for clampingly fastening the leaf spring.

29 Claims, 15 Drawing Figures

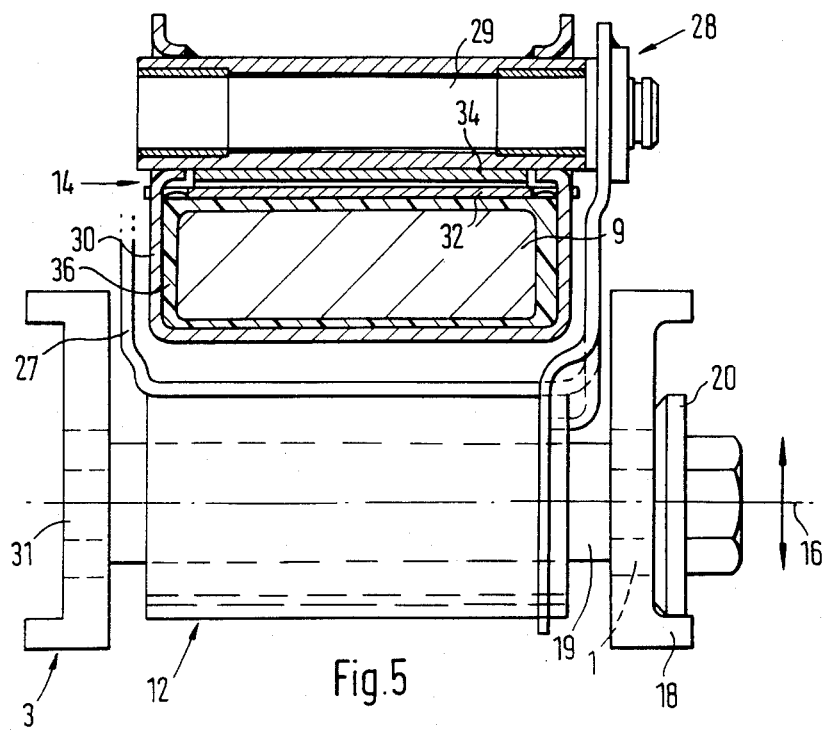
Fig.5
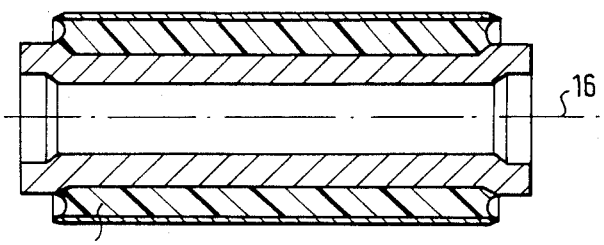
Fig.6
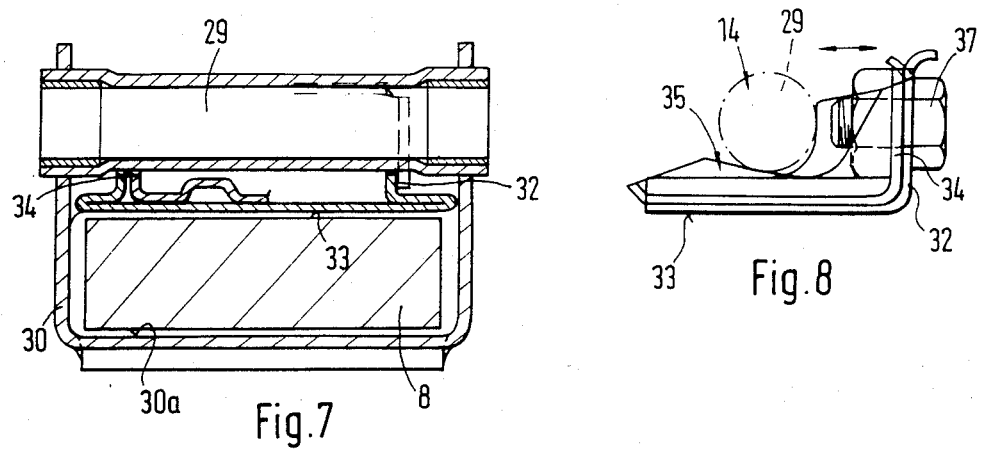
Fig.7
Fig.8

WHEEL SUSPENSION

The present invention relates to a wheel suspension, especially to a front wheel suspension, in which the wheel carriers of mutually opposite wheels are each connected with a guide member, especially a cross guide member which is pivotally connected at the body displaceable in the vertical direction by interposition of a shock absorber, and whereby the cross guide member of each wheel is connected with the free end of a leaf spring that extends transversely to the vehicle longitudinal axis.

A front wheel suspension with a cross leaf spring is known in the prior art in various constructions, for example, as disclosed in the German Offenlegungsschrift No. 29 27 486 or in the German Offenlegungsschrift No. 19 24 175. In these prior art constructions, a high fastening expenditure is required for fixing the leaf spring at the cross bearer or at a wheel guide member, whereby the type of fastening, especially as disclosed in the DE-OS No. 19 24 175, entails an increased wear of the spring material as a result of occurring relative displacements at the fastening point.

It is the object of the present invention to provide a front wheel suspension with an uninterrupted, one-piece cross leaf spring which is lightweight, by means of which large spring travels are achievable and which—in relation to the mass—exhibits a favorable elastic energy absorption. Additionally, the wear at the spring ends is to be prevented. In addition to be usable in a wheel spring system, the spring is to being usable also at the same time for stabilizer action, whereby an adjustment of the vehicle is to be compensated in a simple manner with an inclined position conditioned on tolerances.

The underlying problems are solved according to the present invention in that the free ends of the leaf spring are connected with the cross guide members at a distance from the latter by way of interconnected guide arms which are held in elastic bearings relatively movable and pivotal with respect to the cross guide members and which are provided at their ends opposite these bearing supports with clamping devices for clampingly fastening the leaf spring.

The advantages primarily achieved with the present invention reside in that owing to the construction of the leaf spring from a composite fiber construction of glass fiber cords arranged unidirectionally and embedded in an epoxy resin, a favorable elastic energy absorption is achieved. Simultaneously therewith a leaf spring with a low weight is realized by this material. The spring ends are pivotally connected in an advantageous manner at the respective cross bearer, not in a frictional contact to one another but in a free, relatively movable manner. As a result thereof an excessive wear is avoided which occurs in particular with large spring travels as become necessary in particular with four-wheel drive vehicles that have cross-country capabilities. In order that a tolerance-conditioned inclination of the vehicle can be corrected from the outside without a great amount of expenditure, an adjusting mechanism with an eccentric is provided at the guide arm.

A clamping mechanism serves for fixing the spring ends in the guide member, which elastically receives the free end corresponding to the spring adjustment. The elastic mounting prevents vibrational overloads. In lieu of constructing the guide member as rigid arm, also a spring relatively stiff in the compression direction may be used which receives the leaf spring end.

In order that the leaf spring is protected against mechanical damages, for example by stone impacts or during use in cross-country terrain, it is covered at the top and bottom by a bearer that receives at the same time the center bearing supports for the leaf spring.

The leaf spring preferably has a constant stress distribution over the length, whereby the adaptation of the moment of resistance against bending to the bending moment curve is necessary over the spring length. In the construction according to the present invention, the width of the spring is therefore constant over the entire length whereby the number fibers in cross section is the same and the filaments or fibers extend as endless fibers over the entire spring length. However, also a construction is feasible with the present invention, in which the spring has a non-constant cross sectional area, i.e. a constant width and a decreasing spring thickness and the spring shape extends consequently parabolically shaped in cross section.

These and other objects, features and advantages of the present invention will become more apparent from the following description when taken in connection with the accompanying drawing which shows, for purposes of illustration only, one embodiment in accordance with the present invention, and wherein:

FIG. 5 is an elevational view, partly in cross section, of a guide arm assembled of the outer and of the inner bearing bracket with clamped-in leaf spring;

FIG. 6 is a cross sectional view through the lower bearing of the guide arm;

FIG. 7 is a cross sectional view through a clamping device in accordance with the present invention assembled of a shoe and of a carriage and arranged in the guide arm;

FIG. 8 is a side elevational view of the clamping device of FIG. 7;

Figure 1:
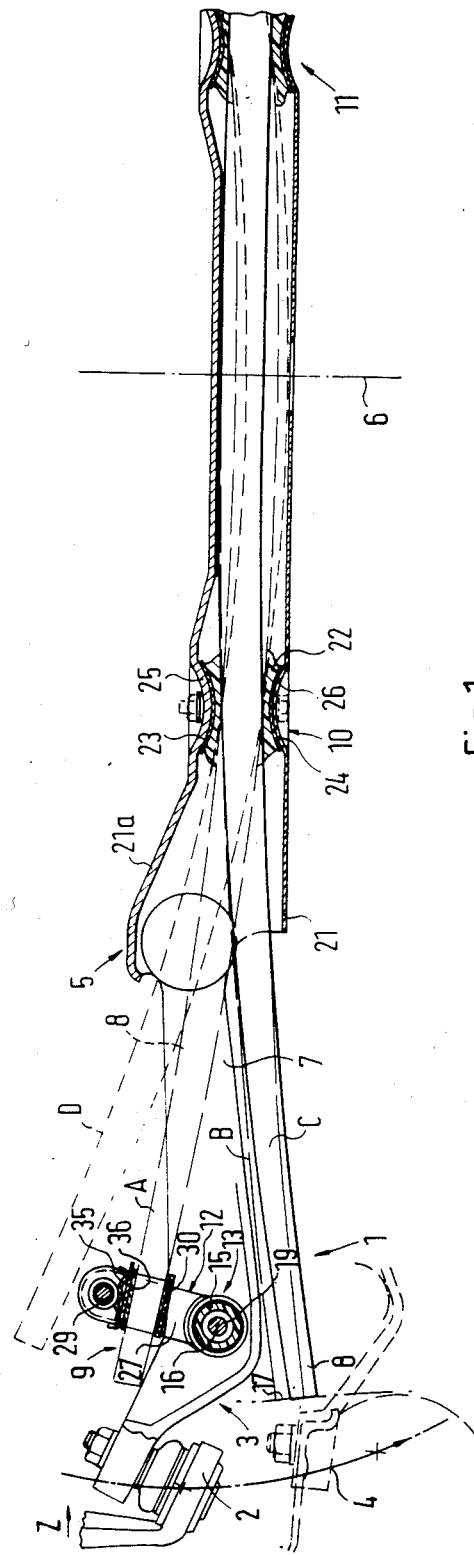
FIG. 1 is a front elevational view on a front wheel suspension in accordance with the present invention with a guide arm pivotally connected at a cross guide member and with a leaf spring connected with the guide arm.
Figure 4:
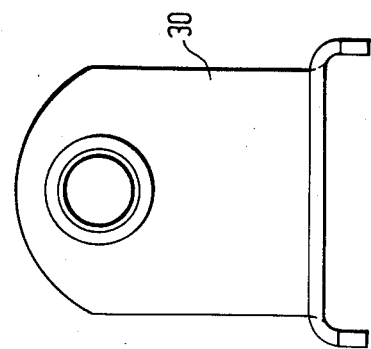
FIG. 4 is a front elevational view of the inner bearing bracket of the guide arm.
Figure 3:
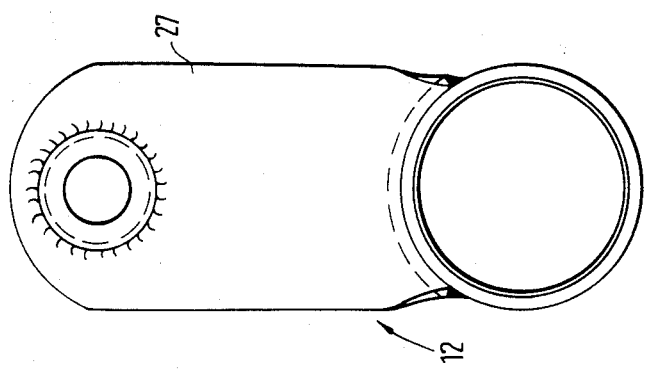
FIG. 3 is a front elevational view of the outer bearing bracket of the guide arm.
Figure 2:
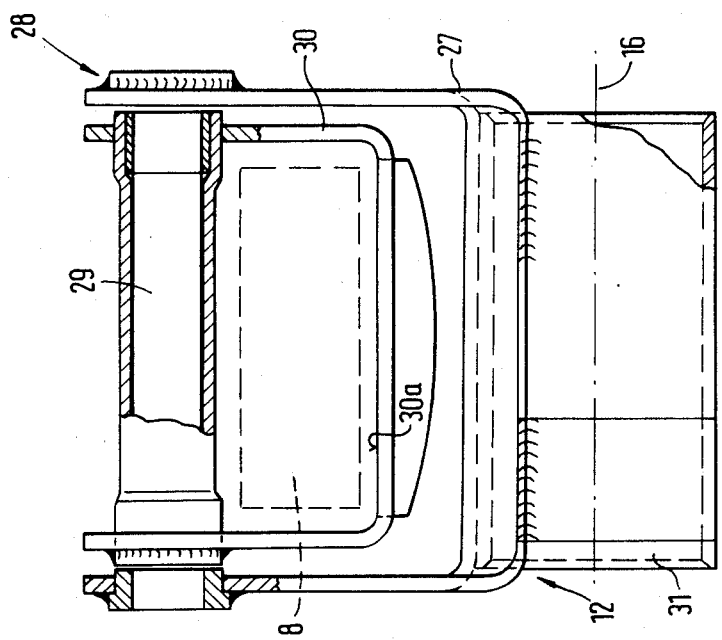
FIG. 2 is an elevational view, partly in cross section, of the two-partite guide arm consisting of an outer and of an inner bearing bracket, as viewed in the direction of the arrow Z in FIG. 1.
Figure 9:
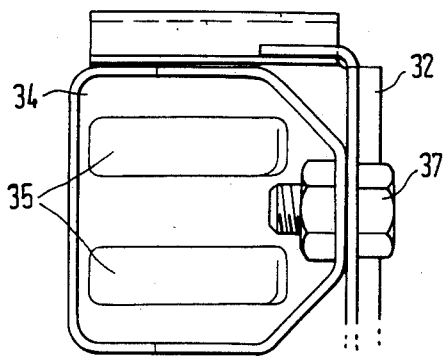
FIG. 9 is a top plan view on the clamping devices of FIGS. 7 and 8.
Figure 10:
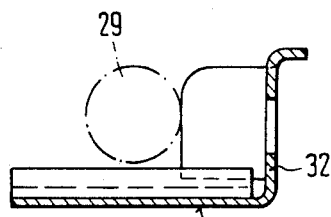
FIG. 10 is a cross-sectional view through the shoe of the clamping device.
Figure 11:
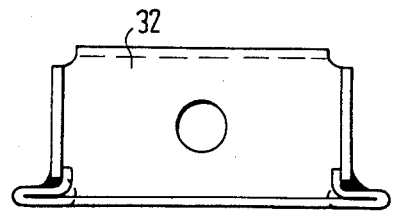
FIG. 11 is an end-elevational view of the shoe of FIG. 10.
Figure 12:
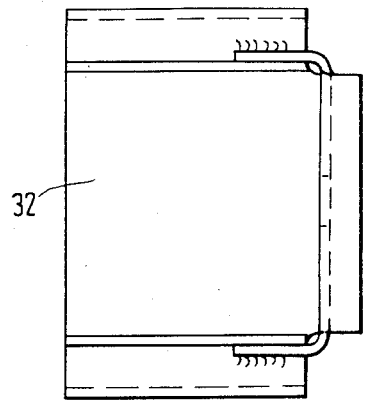
FIG. 12 is a top plan view on the shoe of FIGS. 10 and 11.
Figure 13:
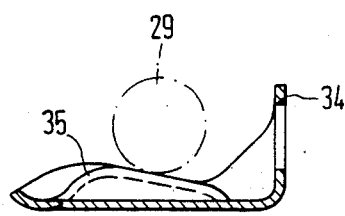
FIG. 13 is a cross-sectional view through the carriage of the clamping device in accordance with the present invention.
Figure 14:
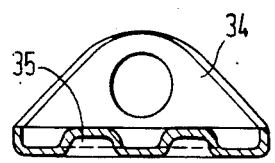
FIG. 14 is a transverse cross-sectional view through the carriage of FIG. 13.
Figure 15:
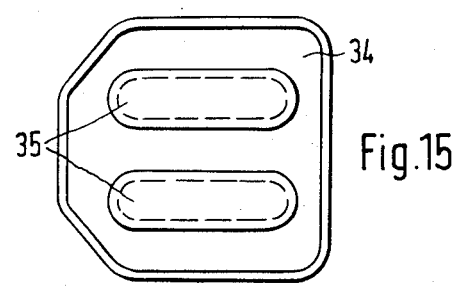
FIG. 15 is a top plan view on the carriage of the clamping device illustrated in FIGS. 13 and 14.

Referring now to the drawings wherein like reference numerals are used throughout the various views to designate like parts, a wheel suspension generally designated by reference numeral 1 is illustrated in FIG. 1, in which the wheel carriers 2 of an axle are each connected with a cross guide member generally designated by reference numeral 3. The cross guide member 3 is pivotally connected at the body (bearer 5) displaceable in the vertical direction by interconnection of a shock absorber (not shown) along a curved track. The cross guide member 3 includes two arms 7 extending toward the vehicle longitudinal center axis 6, between which extends a leaf spring 8. The leaf spring 8 is arranged disposed transversely to the longitudinal center axis 6 and is constructed in one piece. It is supported with its free ends 9 at the cross guide member 3 and in its center area—on both sides of the longitudinal center axis 6—on the body side in at least two identical bearing places generally designated by reference numerals 10 and 11.

The fastening of the free ends 9 of the leaf spring 8 takes place in each case in a clamping device generally designated by reference numeral 14 (FIG. 5) of the guide arms 12, which are connected with the cross guide member 3. These guide arms 12 extend from their bearing support 13 (FIG. 1) in the cross guide member 3 upwardly approximately in the vertical direction. In FIG. 1 of the drawing, only the guide arm 12 of one wheel side is illustrated whereas the further guide arm at the opposite wheel side is constructed and pivotally connected in an identical manner.

The bearing support 13 of the guide arm 12 on the side of the guide member includes an elastic bushing 15 (FIG. 6), by means of which a pivoting about a horizontal axis 16 as well as a cardanic movement of at least 3° becomes possible.

The guide arm 12 is preferably arranged near an inner vertical wheel longitudinal plane 17 (FIG. 1) and holds the leaf spring 8 in a vertical wheel cross plane that extends through the axis of rotation of the wheel. The leaf spring 8 thereby assumes with its free end 9 a position above the cross guide member 3. The different positions of the leaf spring 8 such as the normal installed position A, the fully outwardly spring deflected position B, the spring unstressed position C and the fully inwardly spring deflected position D are illustrated in FIG. 1, whereby in each case the lower surface of the spring 8 has been selected as reference edge.

An adjusting mechanism including an eccentric 20 (FIG. 5) serves for the adjustment of a horizontal vehicle position. This adjusting mechanism is arranged at the lower bearing support 31 of the guide arm 12 on bolts 19. It includes essentially the eccentric 20 which is supported at the leg 18 of the cross guide member 3. Preferably one eccentric 20 is provided on the bolt 19 on each side of the cross guide member 3. The adjustment of the leaf spring 8 takes place along an elongated aperture which is provided in the web of the cross guide member 3.

The center area of the leaf spring 8 is supported in the bearings 10 and 11. These bearings are arranged in each case at a bearer 5 of the vehicle body at a distance to the vehicle longitudinal center axis 6 and include an elastic element 22. The elastic element 22 surrounds the leaf spring 8 on all sides and is retained between oppositely arranged bearing shells 23 and 24 which are constructed arcuately shaped in the transverse direction. For the form-locking mounting of the bearing shells 23 and 24 in the upper and lower bearers 21 and 21a, the latter are provided with sections 25 and 26 each correspondingly shaped to the bearing shells. At the same time, these bearers 21 and 21a serve to cover the leaf spring 8 against damage.

The guide arm 12 includes an outer U-shaped bearing bracket 27 with a first bearing support 28 FIG. 5 on a bolt 29 for a further inner bearing bracket 30. A second bearing support 31 of the outer bearing bracket 27 takes place in the cross guide member 3 by way of the bolt 19. The bolt 19 is provided with an elastic bushing 15.

In the inner U-shaped bearing bracket 30, the leaf spring 8 is retained clamped-in with its free ends 9 between the bushing 29 and the web 30a FIG. 7, of the bearing bracket 30 by way of the clamping device 14 FIG. 5. The clamping device 14 includes essentially a shoe 32 FIG. 8, with an upper clamping surface 33 facing the leaf spring 8. A carriage 34 is displaceably arranged on respectively in a shoe 32. The carriage 34 includes an inclined surface 35 facing the bolt 29 or such a surface configuration, by means of which a clamping action is attainable. The carriage 34 is displaceable relative to the shoe 32 in the direction of the arrows by means of a clamping bolt 37 (FIG. 8). By tightening the clamping bolt 37, the leaf spring 8 is pressed more or less against the lower clamping surface 30a, 31 of the inner bearing bracket 30 corresponding to the requirements. An elastic jacketing 36 of the leaf spring 8 within the bearing bracket 30 serves for increasing the friction and damping vibrations.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A wheel suspension, in which wheel carriers of mutually oppositely disposed wheels are connected each with a guide member which is pivotally connected at a relatively fixed part so as to be displaceable in the generally vertical direction, and in which the guide member of each wheel is operatively connected with the free end of a leaf spring means that extends substantially transversely to the vehicle longitudinal axis and is supported at the fixed part, and in which said leaf spring means, in addition to its function as wheel spring, also serves as stabilizer, comprising guide arm means operatively connecting the free ends of the leaf spring means with the guide members at a distance to the latter, elastic bearing support means for retaining the guide arm means so as to be relatively movable and pivotal with respect to the guide members, and clamping means at the ends of the guide arm means opposite the elastic bearing support means for clampingly fastening the leaf spring means.

2. A wheel suspension according to claim 1, wherein the wheel suspension is a front wheel suspension for a motor vehicle.

3. A suspension according to claim 1, wherein the guide members are formed by cross guide members.

4. A suspension according to claim 3, in which the relatively fixed part is part of the vehicle body which includes a bearer means, and wherein the center area of the leaf spring means is elastically clamped-in between two bearing support means, said bearing support means being arranged at said bearer means at a distance to the vehicle longitudinal axis.

5. A suspension according to claim 4, wherein the center section of the leaf spring means is covered in its top and bottom surface by way of walls of the bearer means.

6. A suspension according to claim 4 wherein said bearing support means include elements elastically surrounding the leaf spring means, and bearing shells arranged mutually oppositely and constructed of arcuate shape in the vehicle transverse direction for retaining therebetween the elastic elements.

7. A suspension according to claim 6, wherein said bearer means includes walls which, within the center area of the bearing support means, have an arcuate configuration in the transverse direction corresponding to the bearing shells and which form-lockingly receive the bearing shells.

8. A suspension according to claim 3, wherein the guide arm means extends generally vertically from the cross guide member, the leaf spring means being held at its end on the free upper end of the guide arm means and this area of the leaf spring means assuming a position above the cross guide member.

9. A suspension according to claim 3, wherein the guide arm means is arranged adjacent the inner vertical wheel longitudinal plane in the base portion of the cross guide member and retains the leaf spring means in a vertical wheel center cross plane that extends through the axis of rotation of the wheel.

10. A suspension according to claim 3, wherein the guide arm means includes an outer U-shaped bearing bracket means with a first bearing support means for a further inner U-shaped bearing bracket means which includes the clamping means for the leaf spring means and a second bearing support means for the connection with the cross guide member.

11. A suspension according to claim 10, wherein the clamping means includes an upper clamping surface which is disposed opposite a further lower clamping surface, the free end of the leaf spring means being held clamped-in between said two clamping surface under interposition of an elastic element.

12. A suspension according to claim 11, wherein the upper clamping surface is formed by a shoe means which is operatively connected with a carriage means displaceable on the shoe means, said carriage means being supported changeable in position against a bushing of the first bearing support means.

13. A suspension according to claim 12, wherein the carriage means is provided with inclined surfaces at the surface thereof facing the bearing bolt which increase the clamping force on the leaf spring means.

14. A suspension according to claim 12, wherein the carriage means is changeable in position relative to the shoe means by means of a clamping bolt.

15. A wheel suspension according to claim 1, wherein the leaf spring means is made of a composite fiber material.

16. A suspension according to claim 1, wherein the bearing support means of the guide arm means in the cross bearer means includes a bearing bolt which is adjustable in height by way of an eccentric means and said eccentric means is supported at a leg in the guide member.

17. A wheel suspension in which wheel carriers of mutually oppositely disposed wheels are connected each with a guide member which is pivotally connected at a relatively fixed part so as to be displaceable in the generally vertical direction, and in which the guide member of each wheel is operatively connected with the free end of a leaf spring means that extends substantially transversely to the vehicle longitudinal axis and is supported at the fixed part, and in which said leaf spring means, in addition to its function as wheel spring, also serves as stabilizer, comprising guide arm means operatively connecting the free ends of the leaf spring means with the guide members at a distance to the latter, elastic bearing support means for retaining the guide arm means so as to be relatively movable and pivotal with respect to the guide members, and clamping means at the ends of the guide arm means opposite the elastic bearing support means for clampingly fastening the leaf spring means, wherein the guide members are formed by cross guide members, in which the relatively fixed part is part of the vehicle body which includes a bearer means, and wherein the center area of the leaf spring means is elastically clamped-in between two bearing support means, said bearing support means being arranged at said bearer means at a distance to the vehicle longitudinal axis, wherein aid bearing support means include elements elastically surrounding the leaf spring means, and bearing shells arranged mutually oppositely and constructed of arcuate shape in the vehicle transverse direction for retaining therebetween the elastic elements, wherein said bearer means includes walls which, within the center area of the bearing support means, have an arcuate configuration in the transverse direction corresponding to the bearing shells and which form-lockingly receive the bearing shells, and wherein the guide arm means extends generally vertically from the cross guide member, the leaf spring mens being held at its end of the free upper end of the guide arm means and this area of the leaf spring means assuming a position above the cross guide member.

18. A suspension according to claim 17, wherein the guide arm means is arranged adjacent the inner vertical wheel longitudinal plane in the base portion of the cross guide member and retains the leaf spring means in a vertical wheel center cross plane that extends through the axis of rotation of the wheel.

19. A suspension according to claim 17, wherein the center section of the leaf spring means is covered in its top and bottom surface by way of walls of the bearer means.

20. A suspension according to claim 17, wherein the bearing support means of the guide arm means in the cross bearer means includes a bearing bolt which is adjustable in height by way of an eccentric means and said eccentric means is supported at a leg in the cross guide member.

21. A suspension according to claim 17, wherein the guide arm means includes an outer U-shaped bearing bracket means with a first bearing support means for a further inner U-shaped bearing bracket means which includes the clamping means for the leaf spring means and a second bearing support means for the connection with the cross guide member.

22. A suspension according to claim 21, wherein the clamping means includes an upper clamping surface which is disposed opposite a further lower clamping surface, the free end of the leaf spring means being held clamped-in between said two clamping surface under interposition of an elastic element.

23. A suspension according to claim 22, wherein the upper clamping surface is formed by a shoe means which is operatively connected with a carriage means displaceable on the shoe means, said carriage means being supported changeable in position against a bushing of the first bearing support means.

24. A suspension according to claim 23, wherein the carriage means is provided with inclined surfaces at the surface thereof facing the bearing bolt which increase the clamping force on the leaf spring means.

25. A suspension according to claim 24, wherein the carriage means is changeable in position relative to the shoe means by means of a clamping bolt.

26. A wheel suspension in which wheel carriers of mutually oppositely disposed wheels are connected each with a guide member which is pivotally connected at a relatively fixed part so as to be displaceable in the generally vertical direction, and in which the guide member of each wheel is operatively connected with the free end of a leaf spring means that extends substantially transversely to the vehicle longitudinal axis and is supported at the fixed part, and in which said leaf spring means, in addition to its function as wheel spring, also serves as stabilizer, comprising guide arm means operatively connecting the free ends of the leaf spring means with the guide members at a distance to the latter, elastic bearing support means for retaining the guide arm means so as to be relatively movable and pivotal with respect to the guide members, and clamping means at the ends of the guide arm means opposite the elastic bearing support means for clampingly fastening the leaf spring means, wherein the leaf spring material is a composite fiber material of fiberglass cords embedded in epoxy resin and arranged extending substantially in the same direction.

27. A suspension according to claim 26, wherein the leaf spring means has a constant cross section over the entire length.

28. A suspension according to claim 26, wherein the leaf spring means has a constant cross section, whereby the center clamped-in area of the leaf spring means has a greater thickness and smaller width then the end areas of the leaf spring means.

29. A suspension according to claim 26, wherein the leaf spring means is constructed parabolically shaped and has a similar width over the length thereof with a thickness continuously increasing to the center area.

* * * * *